May 24, 1938.  B. C. VEST  2,118,747
GEOMETRICAL INSTRUMENT
Filed June 30, 1937  2 Sheets—Sheet 1
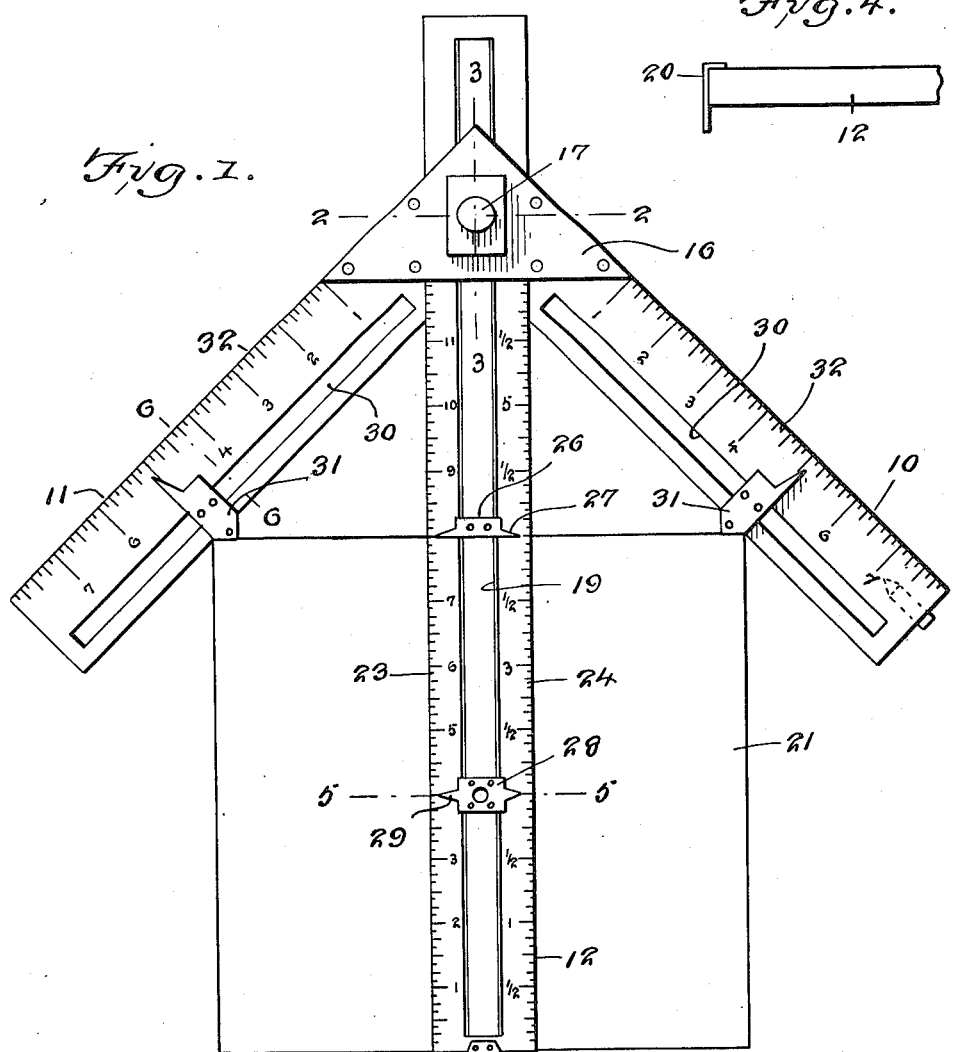
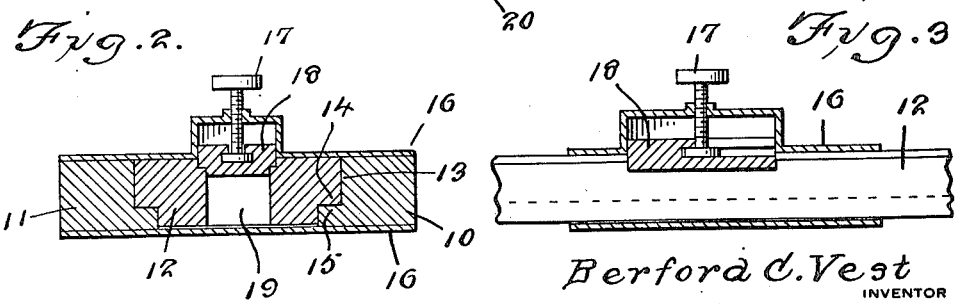
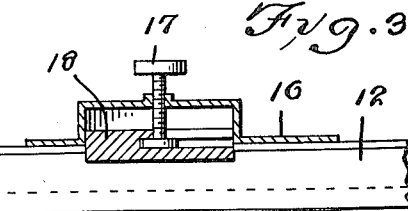
Berford C. Vest
INVENTOR
BY Victor J. Evans & Co.
ATTORNEYS May 24, 1938.  B. C. VEST  2,118,747
GEOMETRICAL INSTRUMENT
Filed June 30, 1937  2 Sheets-Sheet 2
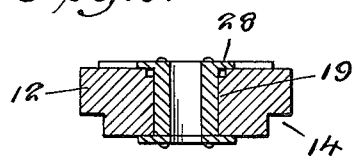
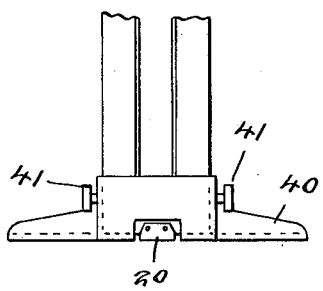
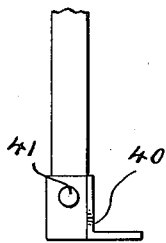
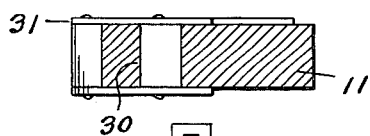
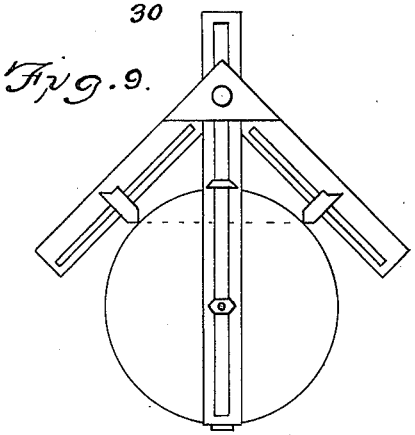
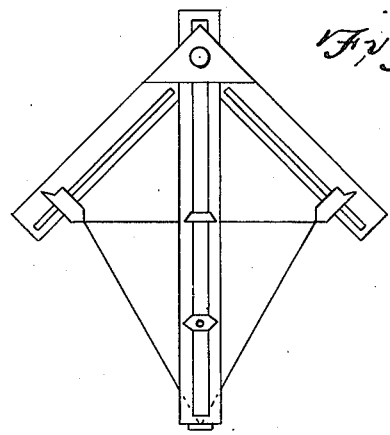
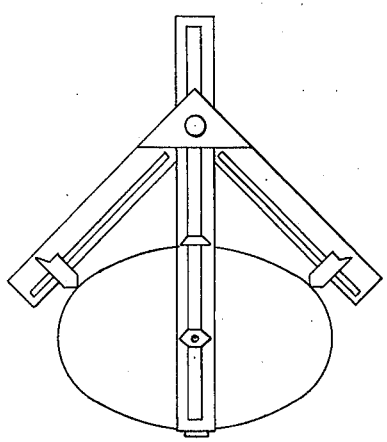
Berford C. Vest
INVENTOR
BY Victor J. Evans & Co.
ATTORNEYS Patented May 24, 1938

2,118,747

UNITED STATES PATENT OFFICE 2,118,747

GEOMETRICAL INSTRUMENT

Berford C. Vest, Llano, Tex.

Application June 30, 1937, Serial No. 151,237

2 Claims. (Cl. 33—191)

My invention relates to geometrical instruments and more particularly to that class known as center-finders.

One of the principal objects of my invention is to provide a geometrical instrument equipped with means for locating the centers of various work-objects having either level or curved faces.

Another object of my invention is to provide means whereby the center of a work-object may be readily marked or inscribed upon being located.

Other objects and advantages will be apparent from the following description, appended claims and annexed drawings.

Referring to the drawings wherein like reference characters designate like parts throughout the several views:

Fig. 1 is a front view of my invention.

Fig. 2 is a sectional view taken on a line 2—2 of Fig. 1.

Fig. 3 is a sectional view taken on a line 3—3 of Fig. 1.

Fig. 4 is a detail side elevation of an end of the rule member.

Fig. 5 is a sectional view taken on a line 5—5 of Fig. 1.

Fig. 6 is a sectional view taken on a line 6—6 of Fig. 1.

Fig. 7 is a detail front view of one end of the rule member showing a T-square head attached thereto.

Fig. 8 is a side elevation of Fig. 7.

Fig. 9 is a front elevation of the invention, illustrating the same as being applied to a cylindrical-shaped figure.

Fig. 10 is a front elevation of the invention showing the same applied to a regular triangular-shaped figure.

Fig. 11 is similar to Fig. 9 but showing the invention illustrated in connection with an elliptical-shaped figure.

My invention, in the preferred embodiment illustrated in the drawings, comprises an instrument formed with a pair of anti-parallel arms 10 and 11 connected together to form a crotch and having a bisector rule member 12 connected to said arms at the jointure thereof.

The rule member 12 is adapted to sliding engagement within a transversely extending aperture 13 formed in the jointure of the arms 10 and 11. Offset shoulders 14, formed on the lower face of the rule member, engage correspondingly formed shoulders 15 on the arms 10 and 11 and serve to secure the rule member in alignment.

Plates 16 enclose the jointure, one of said plates being formed with a bridge for supporting and adjusting screw 17 threaded therein. The screw has secured thereto a rule clamping member 18 for engagement in a longitudinally extending slot 19 formed in the rule member. Actuating said screw in one direction functions to clamp said rule member between the member 18 and shoulders 15 to secure said rule member in a fixed position relative to said arms 10 and 11. A reverse rotation of the screw releases the tension therebetween and permits sliding movement of said rule member relative to said arms.

One end of the rule member has attached thereto a projecting lug 20 engaging a work-object 21, illustrated in Fig. 1 as being of a square configuration. Each side of the front face of the rule member 12 is graduated to form scales 23 and 24, the scale 23 denoting the diameter of the work-object and the scale 24 denoting the radius of the work-object when read in aligned relation with the scale 23.

An adjustable object engaging member 26 is slidably mounted in the slot 19 and adapted to contact the opposite side or face of the work-object as illustrated in the drawings. The member 26 is formed with aligned pointers 27 for registering with readings on both of the scales simultaneously.

A center finding member 28 is also secured within the slot 19 and adjustable longitudinally thereof and is likewise provided with pointers 29 for registering with readings on both of the scales simultaneously. Said member has formed therein an opening for receiving the point of a pencil or tool for marking or inscribing the work-object with a center point, the center of said opening being aligned with the ends of the pointers 29.

Each of the anti-parallel arms is formed with a longitudinally extending slot 30 for receiving therein slidable work-object engaging fingers 31 equipped with pointers for registering with graduations 32 formed on the arms. The graduations on one arm correspond to the graduations on the other arm.

In use, to find the center of a square work-object, the instrument is placed above the object in the manner illustrated in Fig. 1 of the drawings. The fingers 31, on the arms 10 and 11, are set to corresponding dimensions to their respective scales and the edges of the work-object seated against the lower faces of the fingers to abut the inner faces of the arms. The rule member is adjusted so that the lug 20 contacts the lower face of the work-object, and the rule member clamped in this position by means of the screw 17. The member 26 is then moved in the slot to contact the upper face of the work-object. In this position, the diameter of the work-object is determined by the scale 23, the pointers 27 of the member 26 indicating on the scale 23 the diameter and on the scale 24 a setting position for the pointers 29 of the member 28 on the scale 24. Movement of the member 28 on the scale 23 with the position indicated by the member 26 on the scale 24 locates the center of the work-object. A suitable pencil or tool may be inserted through the opening in the member 28 and the work-object marked or inscribed to designate the center.

In ascertaining the center point of a circle, as illustrated in Fig. 9, the work-object is seated within the crotch of the arms 10 and 11 and the fingers 31 adjusted to correspond with each other, the bisector rule member is then manipulated in relation to the arms to position the lower lug 20 in contact with the lower circumference into the face of the figure, the sliding member 26 positioned on the opposite face of the work-object and the center finding member adjusted in the same manner as heretofore described in connection with Fig. 1.

The instrument is operated in the same manner to determine the center points of the regular triangular-shaped object illustrated in Fig. 10 and the elliptical-shaped object illustrated in Fig. 11.

The rule member may be detached from the arms 10 and 11 and a suitable T-square head 40 secured thereto by means of adjusting screws 41 for use as a T-square or straight edge.

It is to be distinctly understood that various changes and modifications in construction may be resorted to without departing from the spirit of the invention or scope of the appended claims.

Having described my invention, what I claim is:

1. An instrument of the class described, comprising, anti-parallel arms forming a croth, a bisector member adjustable in said crotch and having a work-object engaging member, a diameter-finding member mounted on the bisector member, a center-finding member mounted on said bisector member, means carried by said arms and adjustable thereon to coinciding positions for engagement with a work object to position said bisector member centrally of said work-object whereby adjustment of said diameter-finding member relative to said object engaging member indicates the position of said center-finding member.

2. An instrument of the character described, comprising, anti-parallel arms forming a crotch, a bisector member adjustable in said crotch and having a work engaging member, a diameter-finding member slidably mounted on the bisector member, a center-finding member mounted on said bisector member, means carried by said arms and adjustable thereon to coinciding position for engagement with a work object to position said bisector member centrally of said work-object, scales on said bisector member whereby adjustment of said diameter-finding member relative to said object engaging member indicates the position of said center-finding member.

BERFORD C. VEST.